United States Patent [19]
Cole

[11] Patent Number: 5,782,589
[45] Date of Patent: *Jul. 21, 1998

[54] MILLING CUTTER

[76] Inventor: John M. Cole, 3754 Lotus Dr., Waterford, Mich. 48329

[ * ] Notice: This patent issued on a continued prosecution application filed under 37 CFR 1.53(d), and is subject to the twenty year patent term provisions of 35 U.S.C. 154(a)(2).

[21] Appl. No.: 664,642

[22] Filed: Jun. 17, 1996

[51] Int. Cl.$^6$ .................................... B23B 51/00
[52] U.S. Cl. ...................... 408/233; 407/33; 407/54; 408/213
[58] Field of Search ............... 407/34, 40, 42, 407/48, 54, 53; 408/213, 228, 227, 233

[56] References Cited

U.S. PATENT DOCUMENTS

| | | | |
|---|---|---|---|
| 2,575,239 | 11/1951 | Stephens | 408/233 |
| 4,334,446 | 6/1982 | Field | 408/233 |
| 4,721,422 | 1/1988 | Konwal | 408/713 |
| 5,259,707 | 11/1993 | Keller | 407/54 |
| 5,516,242 | 5/1996 | Andronica | 408/227 |
| 5,580,194 | 12/1996 | Satran | 407/40 |
| 5,632,576 | 5/1997 | Storch | 407/54 |

FOREIGN PATENT DOCUMENTS 686 345 A5  5/1992  Switzerland .

OTHER PUBLICATIONS

"Conner-Type Spade Drills & Core Drills", The Gairing Tool Company, 1953.

"Throw-Away Style Drills & Holders", Allied Machine & Engineering Corp., Jan 1991.

"Dapra Cutting Tools", (Advertisement) *Cutting Tool Engineering*, Apr. 1996, p. 23.

*Primary Examiner*—Daniel W. Howell
*Assistant Examiner*—Mark Williams
*Attorney, Agent, or Firm*—Harness, Dickey & Pierce, P.L.C.

[57] ABSTRACT

A milling cutter is provided including a tool holder and a cutting tool insert. The tool holder includes a mounting end portion and a cutting end portion. The cutting end portion includes a slot defined by first and second diagonal surfaces provided in an end of the cutting end portion. The first and second diagonal surfaces form a substantially V-shaped pocket for receiving the cutting tool insert. The cutting tool insert includes a substantially flat body member having a first side having a cutting surface on one edge thereof and a second identical side having a cutting surface on one edge thereof. A hole is provided through the body member from the first side to the second side. First and second surfaces are provided adjacent and substantially perpendicular to the first and second sides. The first and second surfaces define a V-shaped seat portion for seating the cutting tool insert in the V-shaped pocket of the tool holder.

12 Claims, 3 Drawing Sheets

U.S. Patent    Jul. 21, 1998    Sheet 1 of 3    5,782,589
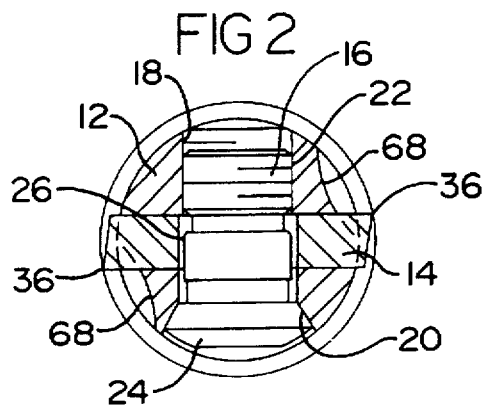
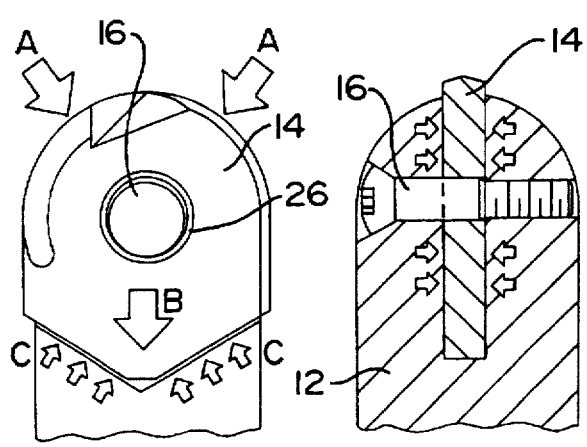
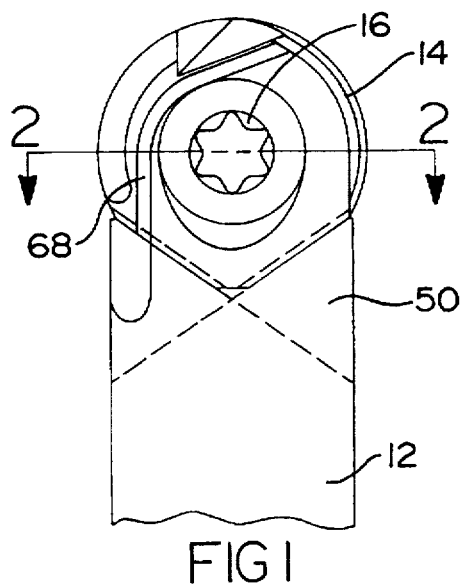
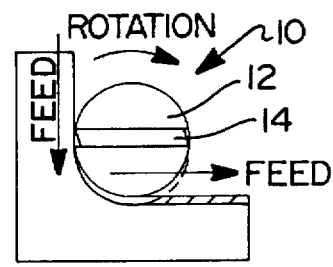
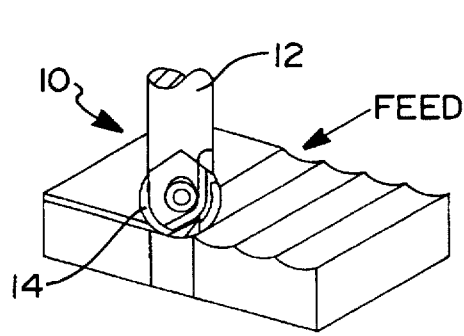
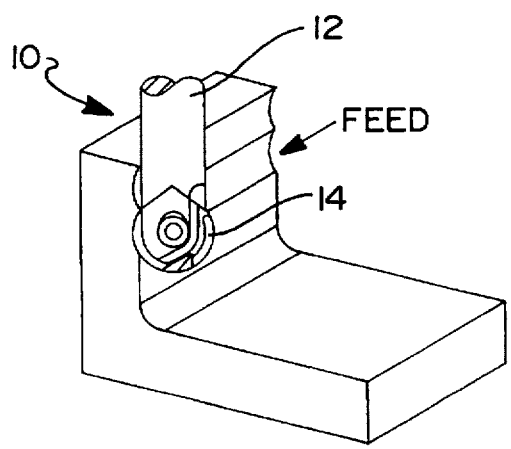

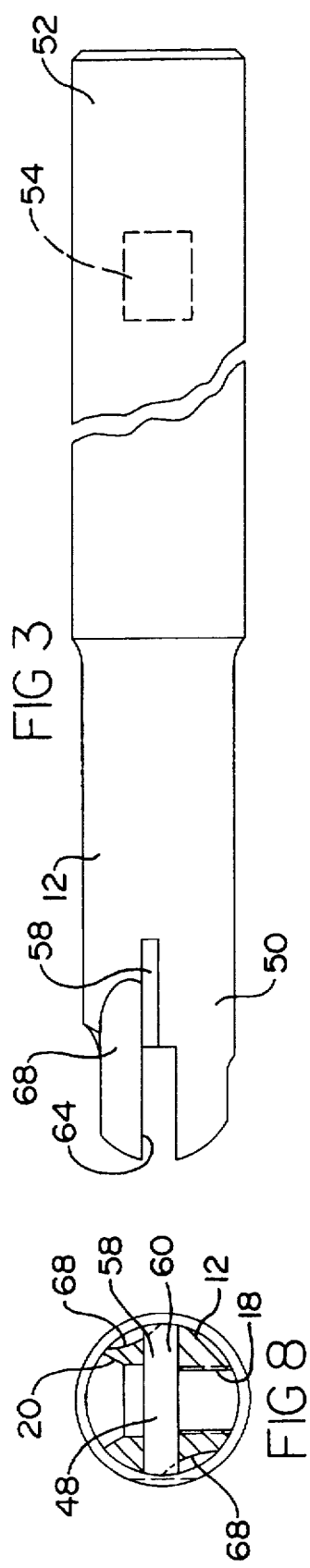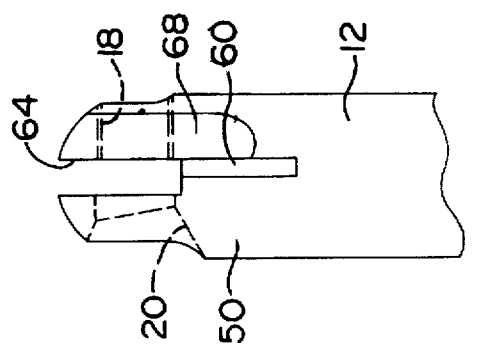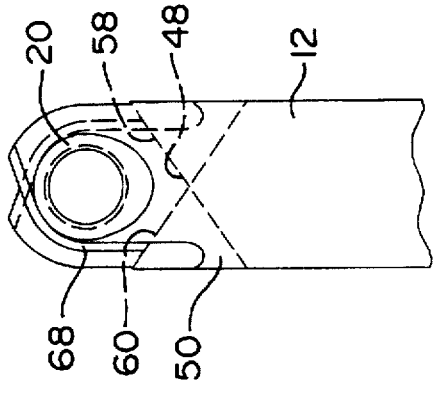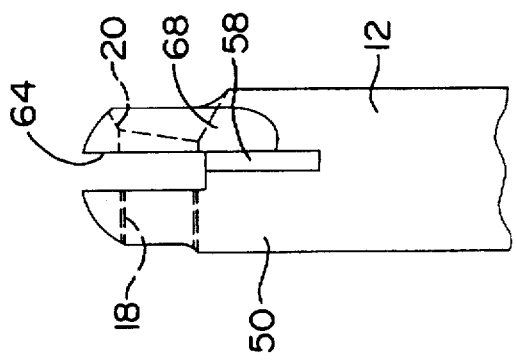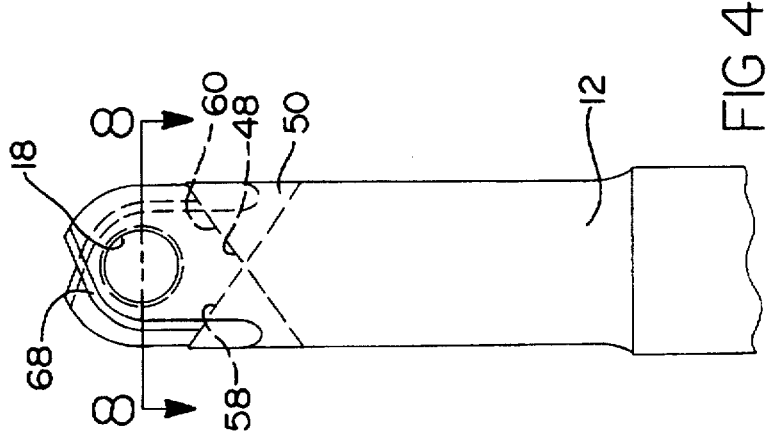

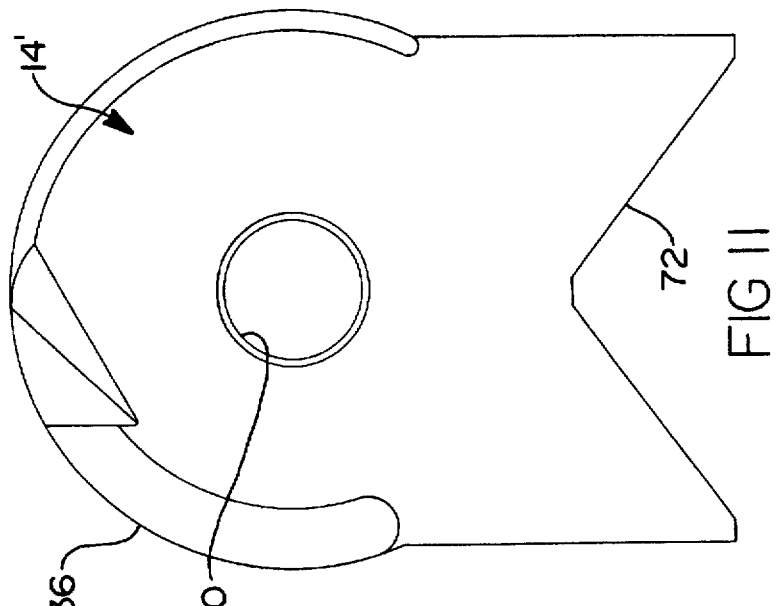
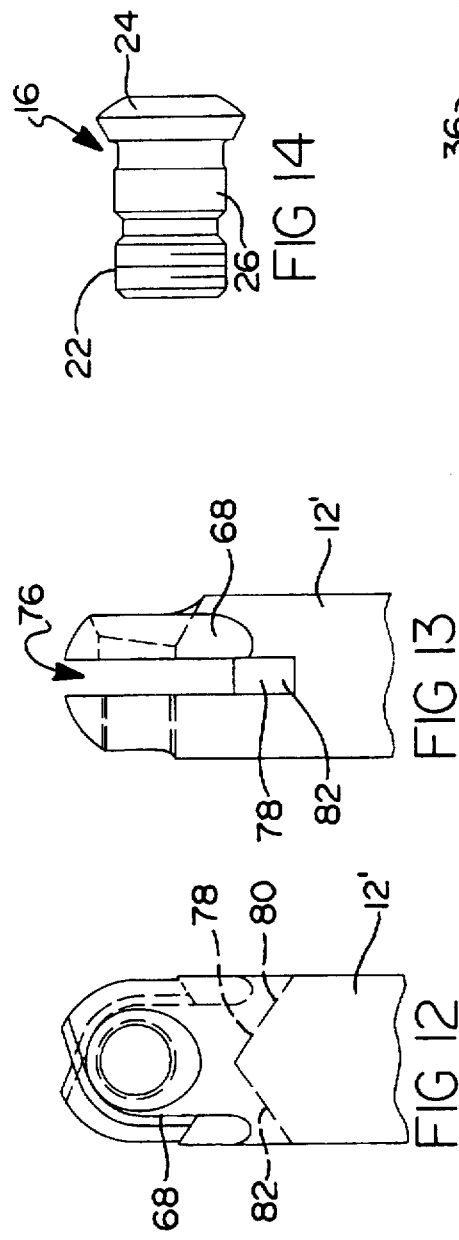
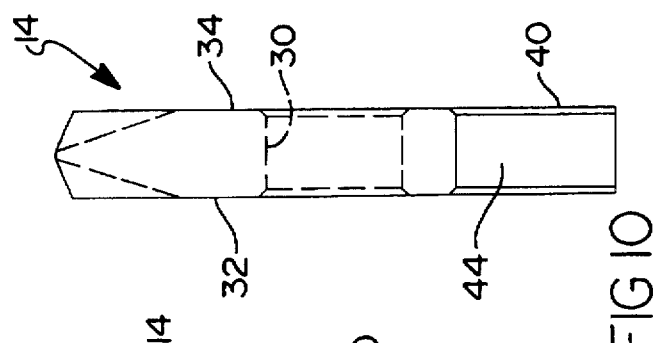
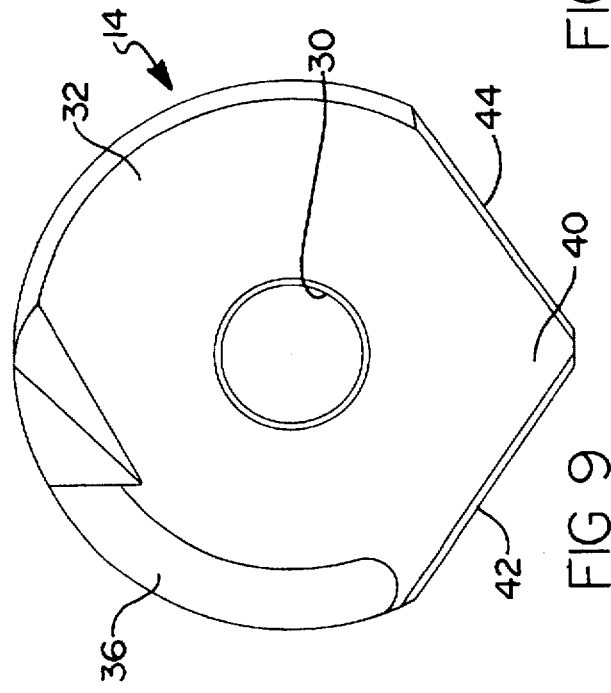

5,782,589

1
MILLING CUTTER

BACKGROUND OF THE INVENTION

1. Field of the Invention

The present invention relates to a milling cutter, and more particularly, to a tool holder having a V-shaped pocket for receiving a V-shaped surface of a cutting tool insert.

2. Description of Background Art

Milling cutters are commonly used for profile and cavity milling in the auto, aircraft, die and mold industries, and in general manufacturing. In particular, the milling tools are used for profiling or copy milling for rapid prototyping. Plastic, non-ferrous, and ferrous materials are precisely milled using milling tools. Smooth blending and finishing of three-dimensional curves and shapes with software-generated tool paths is also accomplished. Cavity milling methods include roughing, finishing, spiral pocketing, Z-level milling, fillet and pencil tracing and cusp removing. As shown in FIGS. 17–19, milling cutters 10 can be used for step-over line milling, as shown in FIG. 17, side milling on steep walls as shown in FIG. 18, and corner radius milling as shown in FIG. 19. Modern milling cutters often include a tool holder and a replaceable cutting tool insert. The tool holder supports the cutting tool insert as the tool holder is rotated about its central longitudinal axis and the cutting tool insert is provided with a cutting surface for milling plastic, non-ferrous, and ferrous materials.

A problem with conventional milling cutters utilizing replaceable cutting inserts is that the cutting tool inserts are commonly not sufficiently supported by the tool holder. It is also difficult to ensure that the cutting tool insert is on a true center-line when put to use in its cutting mode. Thus, it is desirable in the art of milling cutters to provide a tool holder and cutting tool insert design which improves the tool holder's ability to properly support the tool insert under cutting loads.

SUMMARY OF THE INVENTION

Accordingly, it is an object of the present invention to provide a milling cutter design that allows for a near perfect alignment for centering of the insert with the tool holder.

It is another object of the present invention to provide a milling cutter having a tool holder which is capable of receiving lateral forces applied to the cutting tool insert when the cutting tool is subjected to cutting forces such that the forces cause the insert to be accurately retained more tightly or rigidly within a V-shaped pocket in the tool holder.

It is yet another object of the present invention to provide a V-shaped pocket configuration in the tool holder which allows for a straight through cut for manufacturing the V-shaped pocket in the tool holder and allowing for a near perfect match with a V-shape of a cutting tool insert.

It is still another object of the present invention to provide a milling cutter with a tool holder which is specifically designed to support the cutting tool insert on a true center-line when put to use in its cutting mode.

These and other objects of the present invention are obtained by providing a milling cutter comprising: a tool holder including a mounting end portion and a cutting end portion, said cutting end portion including a slot defined by first and second diagonal surfaces provided in an end of said cutting end portion, said first and second diagonal surfaces forming a substantially V-shaped pocket; and a cutting tool insert including a substantially flat body member having a first side having a cutting surface on one edge thereof and a

2 second identical side having a cutting surface on one edge thereof, a hole passing through said body member from said first side to said second side, and first and second surfaces adjacent and substantially perpendicular to said first and second sides, said first and second surfaces defining a V-shaped seat portion for seating said cutting tool insert in said V-shaped pocket of said tool holder.

The objects of the present invention are also obtained by providing a method of making a tool holder for holding a cutting tool insert, comprising the steps of: providing an elongated body portion having a mounting end portion and a cutting end portion; machining a first diagonal surface in an end of said cutting end portion on a first side of a centerline of said body portion having a width equal to one half a width of said cutting tool insert; and machining a second diagonal surface in said end of said cutting end portion on a second side of said centerline of said body portion having a width equal to approximately one half the width of said cutting tool insert; wherein said first and second diagonal surfaces form a slot having a V-shaped pocket for receiving said cutting tool insert.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only and thus are not limitative of the present invention, and wherein:

FIG. 1 is a partial side view of a ball nose milling cutter according to the principles of the present invention;

FIG. 2 is a cross-sectional view along lines 2—2 of FIG. 1;

FIG. 3 is a first side view of a tool holder according to the principles of the present invention;

FIG. 4 is a second partial side view of a tool holder according to the principles of the present invention;

FIG. 5 is a partial side view of the tool holder of the present invention from the same side as shown in FIG. 3 with a screw head seat portion and internally threaded portion shown in phantom;

FIG. 6 is a third partial side view of the tool holder according to the principles of the present invention;

FIG. 7 is a fourth partial side view of the tool holder according to the principles of the present invention;

FIG. 8 is a cross-sectional view taken along lines 8—8 of FIG. 4;

FIG. 9 is a plan view of a cutting tool insert according to the principles of the present invention;

FIG. 10 is a side view of the cutting tool insert shown in FIG. 9;

FIG. 11 is a plan view of a cutting tool insert according to a second embodiment of the present invention;

FIG. 12 is a partial side view of a tool holder according to a second embodiment of the present invention;

FIG. 13 is a second partial side view of a tool holder according to the second embodiment of the present invention;

FIG. 14 is a side view of a screw used for securely mounting the cutting tool insert in the tool holder according to the present invention;

FIG. 15 is a schematic illustration of the forces applied to a cutting tool insert during a cutting operation;

FIG. 16 is a schematic illustration of the forces applied to the side surfaces of a cutting tool insert of the present invention;

FIG. 17 is an illustration of a step-over line milling technique;

FIG. 18 is an illustration of a side milling technique; and

FIG. 19 is an illustration of a corner radius milling technique.

DETAILED DESCRIPTION OF THE PREFERRED EMBODIMENTS

The present invention relates to a milling cutter 10, such as shown in FIG. 1. The ball nose milling cutter 10 includes a tool holder 12 which supports a cutting tool insert 14 which is secured to tool holder 12 by a screw 16. It should be noted that although the illustrative examples show a ball nose-type milling cutter, other flat bottom and back draft inserts may be used with the present invention as will be clear to an artisan skilled in the art of milling cutters.

With reference to FIG. 2, a cross-sectional view along line 2—2 of FIG. 1 is shown. In FIG. 2, screw 16 is shown securely mounting cutting tool insert 14 to tool holder 12. Tool holder 12 is provided with an internally threaded portion 18 and a screw seat portion 20. Internally threaded portion 18 receives threaded portion 22 of screw 16, while a screw head 24 is seated in screw seat portion 20. A side view of screw 16 is shown in FIG. 14 and includes threaded portion 22, head portion 24, and an intermediate cylindrical portion 26. The intermediate cylindrical portion 26 is designed to abut against the internal surface of a through-hole 30 disposed in cutting tool insert 14, as shown in FIG. 9.

The cutting tool insert 14, as shown in FIGS. 9 and 10, includes first and second side surfaces 32, 34, respectively, each of said first and second sides 32, 34 including a cutting surface 36 along at least one edge thereof. Cutting tool insert 14 is also provided with a V-shaped seat portion 40 which is defined by first and second surfaces 42, 44, respectively. First and second surfaces 42,44 are generally perpendicular to first and second side surfaces 32,34.

V-shaped seat portion of cutting tool insert 14 is designed to be seated in a V-pocket 48 of tool holder 12. With reference to FIGS. 3–8, tool holder 12 will be described in greater detail. In FIGS. 5 and 7, as noted previously, tool holder 12 includes an internally threaded portion 18 and a screw head seat portion 20 which are provided in a cutting end portion 50 of tool holder 12. Tool holder 12 is also provided with a mounting end potion 52 which is shown with a flat 54 which assists in securely mounting tool holder 12 in a milling machine. With reference to FIGS. 4 and 6, V-pocket 48 is defined by first and second diagonal surfaces 58 and 60, respectively. First and second diagonal surfaces 58, 60 define the lower surfaces of a slot 64 defined in the cutting end portion 50 of tool holder 12. Slot 64 is formed by having one-half of each side of said slot machined at one-half a thickness of a cutting tool insert 14 from a centerline of tool holder 12. In other words, first and second diagonal surfaces 58 and 60 are machined into cutting end portion 50 on opposite sides of a centerline of tool holder 12. In addition, first and second diagonal surfaces 58, 60 are preferably disposed at approximately 110° with respect to one another so as to form V-pocket 48. It should be noted that other angles may also be used. The angle between first and second surfaces 58, 60 is designed to be equal to the angle between first and second surfaces 42,44 of V-shaped seat portion 40 of cutting tool insert 14.

Tool holder 12 is also provided with cut-away portions 68 which provide a clearance for the cutting surfaces 36 of cutting tool insert 14.

With reference to FIGS. 15 and 16, the forces applied to cutting tool insert 14 will be described. The V-pocket design gives a truly positive seat for cutting tool insert 14 and will not allow insert movement when milling with side thrust. The V-pocket 48 allows for a perfect alignment for centering of insert 14 with tool holder 12, so that insert 14 will run concentric to the tool holder 12 in its operation. The V-shaped seating portion 40 on cutting tool insert 14 aids in counter-acting lateral forces when being used in the cutting mode. As shown in FIG. 15, diagonal forces represented by arrows A cause cutting tool insert 14 to seat more tighter into V-pocket 48 as illustrated by arrow B. The diagonal forces applied to cutting tool insert 14 are counteracted by diagonal forces illustrated by arrows C from first and second diagonal surfaces 58, 60 of tool holder 12. The V-pocket seating eliminates mismatch when changing to fresh inserts 14 and also eliminates the need to program new length or diameter offsets. Another feature of the present invention as shown in FIG. 15 is that when screw 16 is inserted to securely mount cutting tool insert 14 to tool holder 12, intermediate cylindrical portion 26 of screw 16 (FIG. 14) acts as a rigid cam-locking or clamping device for pressing against through-hole 30 of cutting tool insert 14 and causing V-shaped seat portion 40 to seat tightly in V-pocket 48.

With reference to FIG. 16, cutting tool insert 14 is shown in slot 64 of tool holder 12. Screw 16, when tightened provides a "sandwiched" clamping on insert 14 for providing rigidity to cutting tool insert 14.

Cutting tool inserts 14 can be made of carbide, coated carbide, cermet, hardened steel or other suitable materials. Tool holder 12 is preferably made of heat-treated steel.

With reference to FIGS. 11–13, a second embodiment of the present invention will now be described wherein the common elements disclosed in the first embodiment of the present invention will be designated with like-reference numerals. In FIG. 11, a cutting tool insert 14' is shown having a through-hole 30 and cutting surface 36 disposed along at least one edge of a first side thereof. Cutting tool insert 14' is provided with a V-shaped seating portion 72 which is inverted in comparison to V-shaped seat portion 40 of cutting tool insert 14 of the first embodiment of the present invention. Cutting tool insert 14' is received in a slot 76 shown in tool holder 12' of FIG. 13. Slot 76 is provided with a V-pocket 78 having an inverted V-shape with respect to V-pocket 48 according to the first embodiment of the present invention. V-pocket 78 is formed by first and second diagonal surfaces 80 and 82, respectively. Each of the first and second diagonal surfaces 80 and 82 are formed by machining diagonal surfaces, each having a width approximately equal to a width of the insert 14'. First and second diagonal surfaces 80 and 82 are again preferably disposed at approximately 110° relative to one another (although other angles may be used).

A benefit of each of the above described embodiments of the present invention is that the V-pockets 48, 78 formed in holders 12, 12' are obtained by providing straight through machining operations which greatly simplify the manufacturing of the V-style pocket allowing for a near perfect match with the V-shaped seat portion 40, 72 of cutting tool inserts 14, 14', respectively.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A tool holder for holding a cutting tool insert, comprising an elongated body having a centerline defining a first side and a second side; said elongated body having a first diagonal slot extending continuously through said elongated body adjacent to said centerline on said first side and a second diagonal slot extending continuously through said elongated body adjacent to said centerline on said second side, such that a portion of said first and second diagonal slots define a substantially V-shaped concave pocket for receiving the cutting tool insert.

2. The tool holder according to claim 1, wherein said first and second diagonal slots have a width equal to approximately one half a width of the cutting tool insert.

3. The tool holder according to claim 1, wherein said elongated body is provided with a screw head seat portion and an internally threaded portion for receiving a screw for securely mounting the cutting tool insert in said substantially V-shaped pocket.

4. The tool holder according to claim 1, wherein said elongated body is provided with cutaway portions for providing a clearance for a cutting surface of the cutting tool insert.

5. The tool holder according to claim 1, wherein said first and second diagonal slots are disposed at approximately 110° relative to one another.

6. A milling cutter, comprising:
a cutting tool holder having a centerline defining a first side and a second side; said tool holder having a first diagonal slot extending continuously through said tool holder adjacent to said centerline on said first side and a second diagonal slot extending continuously through said tool holder adjacent to said centerline on said second side, such that a portion of said first and second diagonal slots define a substantially V-shaped concave pocket; and a cutting tool insert including a substantially flat body member having a first side having a cutting surface on one edge thereof and a second identical side having a cutting surface on one edge thereof, and first and second surfaces adjacent and substantially perpendicular to said first and second sides, said first and second surfaces defining a substantially V-shaped seat portion for seating said tool insert in said V-shaped concave pocket of said tool holder.

7. The milling cutter according to claim 6, wherein said first and second diagonal slots have a width equal to approximately one half a width of said tool insert.

8. The milling cutter according to claim 6, wherein said tool holder is provided with a screw head seat portion and an internally threaded portion for receiving a screw for securely mounting said tool insert in said substantially V-shaped pocket of said tool holder.

9. The milling cutter according to claim 6, wherein said tool holder is provided with cutaway portions for providing a clearance for said cutting surfaces of said tool insert.

10. The milling cutter according to claim 6, wherein said first and second diagonal slots are disposed at approximately 110° relative to one another.

11. A tool holder for holding a cutting tool insert, comprising an elongated body having a centerline defining a first side and a second side; said elongated body having a first diagonal slot extending continuously through said elongated body substantially on said first side and a second diagonal slot extending continuously through said elongated body substantially on said second side, such that a portion of said first and second diagonal slots define a substantially V-shaped concave pocket for receiving the cutting tool insert.

12. A milling cutter, comprising:
a cutting tool holder having a centerline defining a first side and a second side; said tool holder having a first diagonal slot extending continuously through said tool holder substantially on said first side and a second diagonal slot extending continuously through said tool holder substantially on said second side, such that a portion of said first and second diagonal slots define a substantially V-shaped concave pocket; and a cutting tool insert including a substantially flat body member having a first side having a cutting surface on one edge thereof and a second identical side having a cutting surface on one edge thereof, and first and second surfaces adjacent and substantially perpendicular to said first and second sides, said first and second surfaces defining a substantially V-shaped seat portion for seating said tool insert in said V-shaped concave pocket of said tool holder.

* * * * *